United States Patent
Yen

(10) Patent No.: US 7,116,615 B2
(45) Date of Patent: Oct. 3, 2006

(54) BCA DATA REPRODUCTION METHOD AND APPARATUS FOR OPTICAL DISCS

(75) Inventor: Hung-Tien Yen, Chu Pei (TW)

(73) Assignee: Media Tek Inc., Hsin Chu (TW)

( * ) Notice: Subject to any disclaimer, the term of this patent is extended or adjusted under 35 U.S.C. 154(b) by 442 days.

(21) Appl. No.: 10/606,764

(22) Filed: Jun. 27, 2003

(65) Prior Publication Data

US 2004/0001405 A1     Jan. 1, 2004

(30) Foreign Application Priority Data

Jul. 1, 2002    (TW) ............................... 91114579 A

(51) Int. Cl.
*G11B 7/00* (2006.01)
(52) U.S. Cl. ................ 369/47.35; 369/52.1; 369/53.15
(58) Field of Classification Search ............. 369/47.35, 369/52.1, 53.15
See application file for complete search history.

(56) References Cited

U.S. PATENT DOCUMENTS 6,034,937 A      3/2000   Kumagai
2004/0066723 A1*  4/2004   Hou et al. ............... 369/53.34

FOREIGN PATENT DOCUMENTS

JP          11-073648        *  3/1999

* cited by examiner

*Primary Examiner*—Wayne Young
*Assistant Examiner*—Van T. Pham
(74) *Attorney, Agent, or Firm*—Birch, Stewart, Kolasch & Birch, LLP.

(57) ABSTRACT

A reproduction method for reproducing BCA data for optical discs using the defect signal. The reproduction method for reproducing BCA data includes the steps of: generating a defect signal as a BCA signal by detecting an RF signal of the BCA; generating a BCA data bit stream by sampling the BCA signal according to a sampling clock; and decoding the BCA data bit stream to generate BCA data. Because the defect signal is utilized as the BCA signal of the invention, no additional BCA signal extracting device is needed.

6 Claims, 5 Drawing Sheets

BCA DATA REPRODUCTION METHOD AND APPARATUS FOR OPTICAL DISCS

BACKGROUND OF THE INVENTION

1. Field of the Invention

The invention relates to a BCA data reproduction method and apparatus for optical discs, in which a defect signal generated from a defect detector in a signal reproduction unit is used as a BCA (Burst Cutting Area) signal.

2. Description of the Related Art

Typically, digital video discs or digital versatile discs (hereinafter referred to as DVDs) include DVD-ROM (Read Only Memory), DVD-R (Recordable), and DVD-RAM (Random Access Memory). In the development of DVD-ROM disk, it has been suggested to provide a BCA (Burst Cutting Area) for the purpose of providing information for identifying each of the DVD-ROM discs. A BCA code (signal) is recorded on the aforementioned DVD-ROM disc, after a predetermined video data or the like is recorded, by partially removing with a laser beam an aluminum film which has been deposited as a reflection film. That is, a BCA code is formed by removing an aluminum film of an area not affecting reproduction of a video data, audio data, or computer data which has been recorded as a pit signal on the disc. More specifically, the BCA code is recorded so as to be overwritten on a pit string of dummy data recorded on an area located along the inner circumference of the disc.

As shown in FIG. 1, the BCA 11 is recorded as bar-code stripes in the circumferential direction of the optical disc 10, and each stripe has a length of about 1 mm between 22.3 (+0/−0.4) mm to 23.50±0.5 mm from the center of the center hole of the disc. The BCA data writing method adopts a laser beam to remove a part of the area of the reflection film in a radiation direction. In general, the BCA data is recorded by way of a RZ (return to zero) modulation method and read out by an optical pickup serving for reproducing video data or audio data recorded on the optical disk. Since a dummy pit string has already existed in the original BCA, when the optical pickup head reads the BCA data, the obtained RF (radio frequency) signal includes a BCA stripe signal and a high-frequency pit string signal. FIG. 2 shows the RF signal and the BCA signal for the BCA, wherein FIG. 2(A) shows the RF signal and FIG. 2(B) shows the BCA signal.

FIG. 3 is a block diagram showing a conventional BCA signal reproduction apparatus. In the conventional BCA signal reproduction method, a BCA signal reproduction apparatus is used to extract the desired BCA information from the RF signal. As shown in FIG. 3, the BCA signal reproduction apparatus utilizes a peak detector 31 to detect the peak value of the RF signal. Since the RF signal carries the high-frequency pit signal, a low-pass filter (LPF) 32 has to be used to filter out the high-frequency component in the RF signal. Furthermore, a slice signal generator 33 is utilized to generate a slice signal corresponding to the RF signal. Then, two processed signals are compared in a comparator 34, which generates a BCA signal accordingly. However, since the RF signal is subjected to BCA's mirror modulation, thus causing the phenomenon of DC wandering, and the high-frequency component in the RF signal may not be completely filtered out easily, a correct BCA signal cannot be extracted in the conventional method.

Further scope of the applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

SUMMARY OF THE INVENTION

In view of the above-mentioned problems, an object of the invention is to provide a BCA data reproduction method and apparatus for optical discs, in which a detection circuit for detecting disc defects is utilized to generate the BCA signal.

To achieve the above-mentioned object, a reproduction method for reproducing BCA (Burst Cutting Area) data for optical discs includes the steps of: generating a defect signal as a BCA signal by detecting an RF (Radio Frequency) signal of the BCA; generating a BCA data bit stream by sampling the BCA signal according to a sampling clock; and decoding the BCA data bit stream to generate BCA data.

Because the defect signal is utilized as the BCA signal of the invention, no additional BCA signal extracting device is needed.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 2 shows the RF signal and the BCA signal for the BCA, wherein FIG. 2(A) shows the RF signal and FIG. 2(B) shows the BCA signal.

DETAILED DESCRIPTION OF THE INVENTION

The BCA data reproduction method and apparatus for optical discs will be described with reference to the accompanying drawings.

Figure 1:
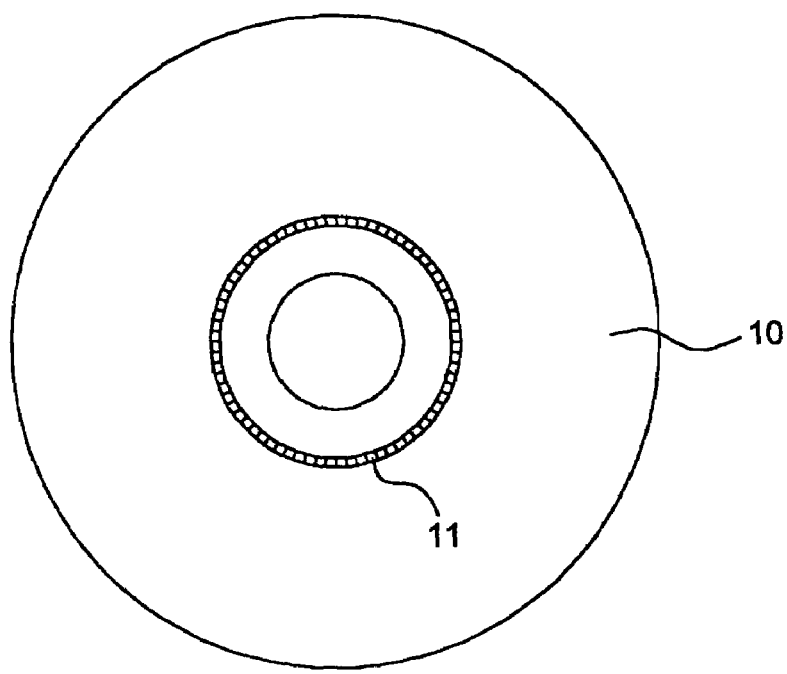
FIG. 1 is a schematic illustration showing the BCA position of the optical disc.
Figure 3:
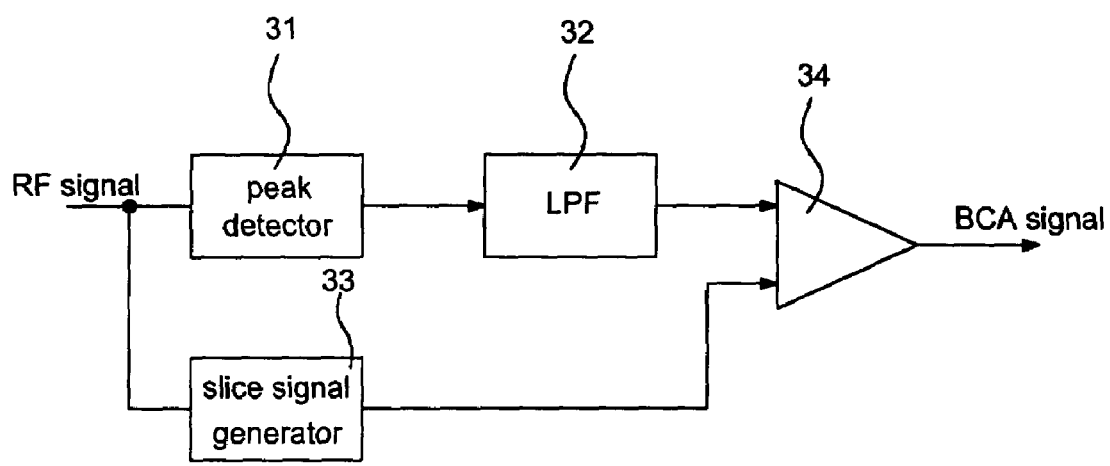
FIG. 3 is a block diagram showing a conventional reproduction apparatus for BCA signals.
Figure 2:
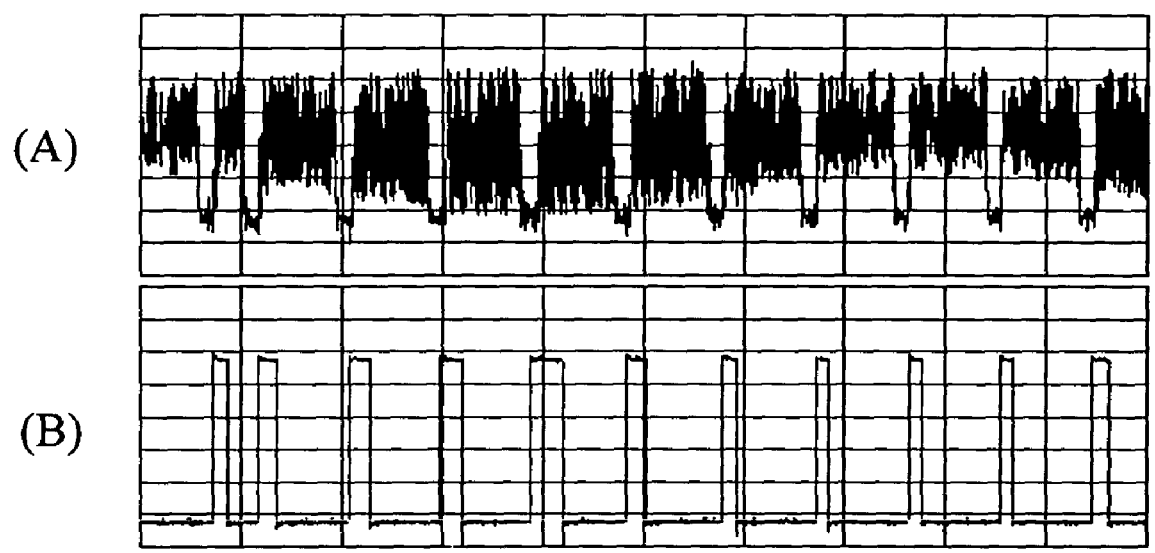

Because the scratch probability of optical discs is very high, the signal reproduction apparatus for optical discs generally includes a defect detector for detecting zones of disc defects (scratches) and processing the defect signal so that correct data may be obtained. The main usage of the defect detector is to detect the natural scratch zones of the disc and then to generate a corresponding defect signal, which is provided to a servo processor as a reference signal for system protection in a signal reproduction apparatus for optical discs. The principle for detecting defects in the defect detector is described as follows. When the optical pickup head passes through the defect zones, the ripple amplitude of the RF signal decreases significantly. Therefore, as long as the difference between the ripple amplitude of the RF signal and the signal generated from the RF signal passing through a low-pass filter (LPF) is found, the scratch zones are determined and the defect signal are generated. The BCA's signal property is similar to that in the condition of a disc scratch. That is, in the RF signal of BCA as shown in FIG. 2(A), zones of the high-frequency signal without pits may correspond to portions on which the strip reflective layers are scratched. Therefore, using the defect detector of the signal reproduction apparatus can separate the BCA signal from the RF signal, as shown in FIG. 2(B). The invention uses the defect signal generated form the defect detector already contained in the signal reproduction apparatus to generate the BCA signal.

Figure 4:
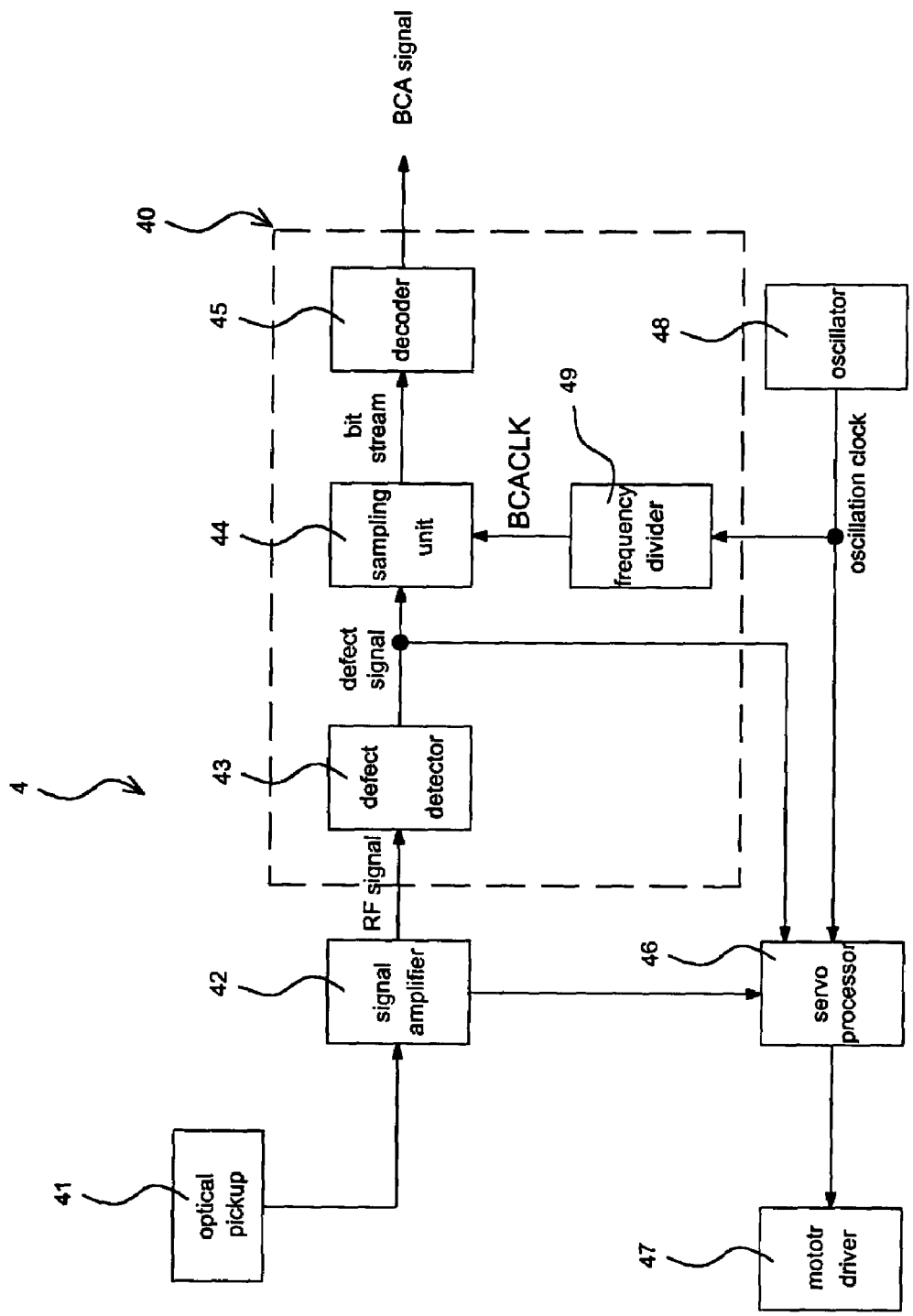
FIG. 4 shows a reproduction apparatus for BCA data of the present invention.

FIG. 4 shows the BCA data reproduction apparatus for optical discs of the present invention. As shown in the drawing, the BCA data reproduction apparatus 40 is arranged within an optical disc drive 4 and includes a defect detector 43, a sampling unit 44, a decoder 45 and a frequency divider 49. The optical disc drive 4 includes an optical pickup 41 to extract the signal recorded on the optical disc. Then, the extracted signal is transferred to a signal amplifier 42. The signal amplifier 42 amplifies the signal to generate the so-called RF signal. When the optical disc drive 4 wants to read the BCA data, the optical disc drive 4 makes the optical pickup 41 drive to the BCA to generate the RF signal for BCA.

The BCA data reproduction apparatus 40 utilizes the defect detector 43 to receive the RF signal of BCA so as to generate the defect signal according to the ripple amplitude of the RF signal, and to provide the defect signal to the sampling unit 44 and a servo processor 46. The servo processor 46 utilizes the defect signal as a reference for system protection. Since the processing operations of the servo processor 46 are well know to one of ordinary skill in the art, detailed description thereof will be omitted. When the sampling unit 44 receives the defect signal, the sampling unit 44 regards the defect signal as the BCA signal, and samples the BCA signal to generate the BCA data bit stream according to the sampling clock BCACLK generated from the frequency divider 49. Then, the decoder 45 decodes the BCA data bit stream to generate the BCA data. Because the optical disc drive 4 already has the defect detector 43, the signal reproduction apparatus for optical discs of the present invention can utilize the defect signal originally supplied from the optical disc drive 4. Therefore, no additional BCA signal reproduction circuit has to be provided, and the cost can be decreased.

Figure 5:
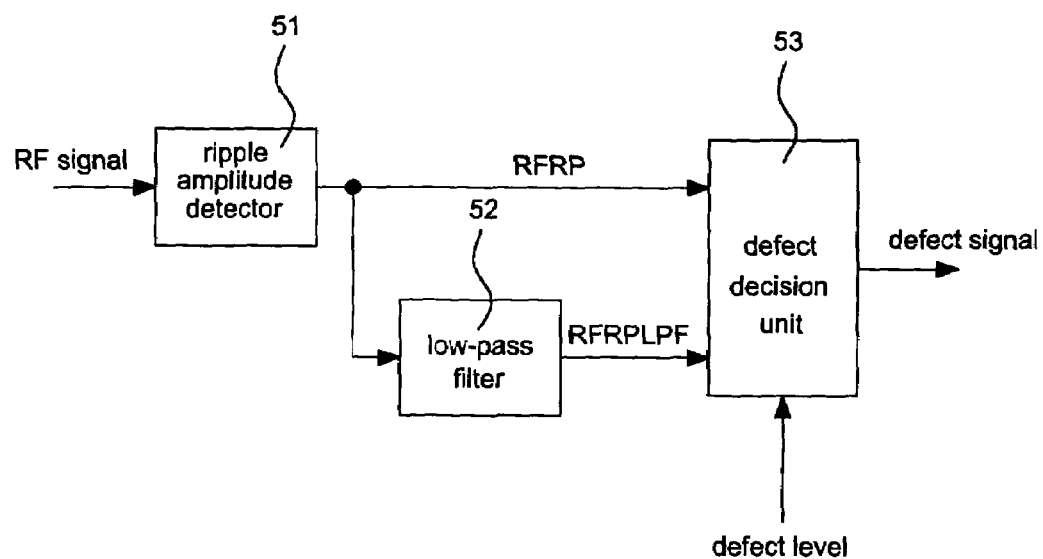
FIG. 5 is a block diagram showing an embodiment of the defect detector.

FIG. 5 is a block diagram showing the defect detector in accordance with an embodiment of the present invention. The defect detector includes a ripple amplitude detector 51, a low-pass filter 52, and a defect decision unit 53. The ripple amplitude detector 51 receives the RF signal and generates an RFRP signal representing the ripple amplitude of the RF signal. Under the normal tracking condition, the RFRP signal is almost kept at the same level, but is reduced only when a defect zone is read. The low-pass filter 52 filters the RFRP signal to generate a FRPLPF signal. Consequently, defect zones of the disc may be detected using the defect decision unit 53 to compare the level of the RFRP signal to that of the RFRPLPF signal. As a result, the defect signal corresponding to the BCA signal can be obtained as long as the defect level is properly set. Of course, other methods may be used to generate the defect signal in the defect detector, and the methods may also be applied to the invention.

Figure 6:
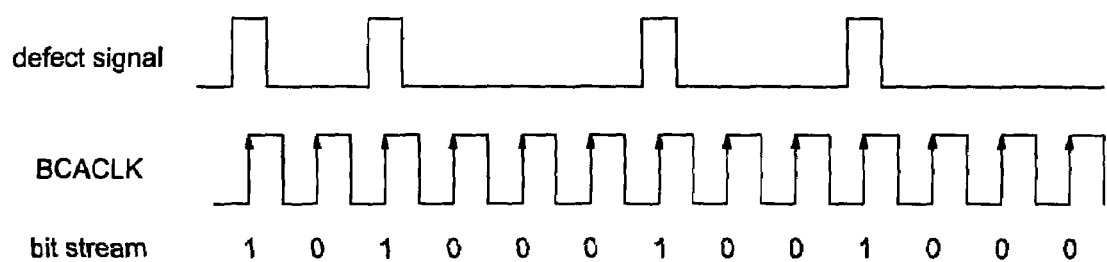
FIG. 6 is a timing diagram showing a proper sampling clock for sampling the defect signal.

FIG. 6 is a timing diagram showing a proper sampling clock for sampling the defect signal. The BCA signal sampling unit 44 receives the defect signal, samples the defect signal according to the sampling clock BCACLK, and then generates the BCA bit stream. The BCA data decoder 45 performs a BCA channel bit demodulation, a sync detection, an error correction code check and an error detection code check, according to the BCA bit stream, to get the BCA data recorded on the disc. The function and structure of the BCA channel bit demodulation, the sync detection, the error correction code check and the error detection code check are well know to one of ordinary skill in the art, detailed description thereof will be omitted.

In addition, in response to the DVD requirement of extracting BCA data at a high speed, the reference clock of the BCA sampling circuit of this apparatus is provided from an oscillation clock XCK, which is generated from an oscillator 48 and then passes through the frequency divider 49. The system can set various reference clocks corresponding to various BCA signal frequencies at different rotating speeds, so as to precisely extract the BCA data at various rotating speeds. For example, under the condition that the oscillation clock is 33.8688 MHz and the rotating speed is 1440 RPM (about 1Xs DVD), the BCA's channel bit time width is 8.89 µs. At this time, the frequency divider 49 is programmed to 301 to generate a sampling clock with a frequency of 11.25 kHz. When reading is performed at 2880 RPM, because the channel bit time width is reduced to 4.445 µs, the frequency divider 49 is programmed to 150. At this time, the frequency of the sampling clock is about 22.6 kHz. As a result, the apparatus can correctly generate BCA data at various speeds.

Figure 7:
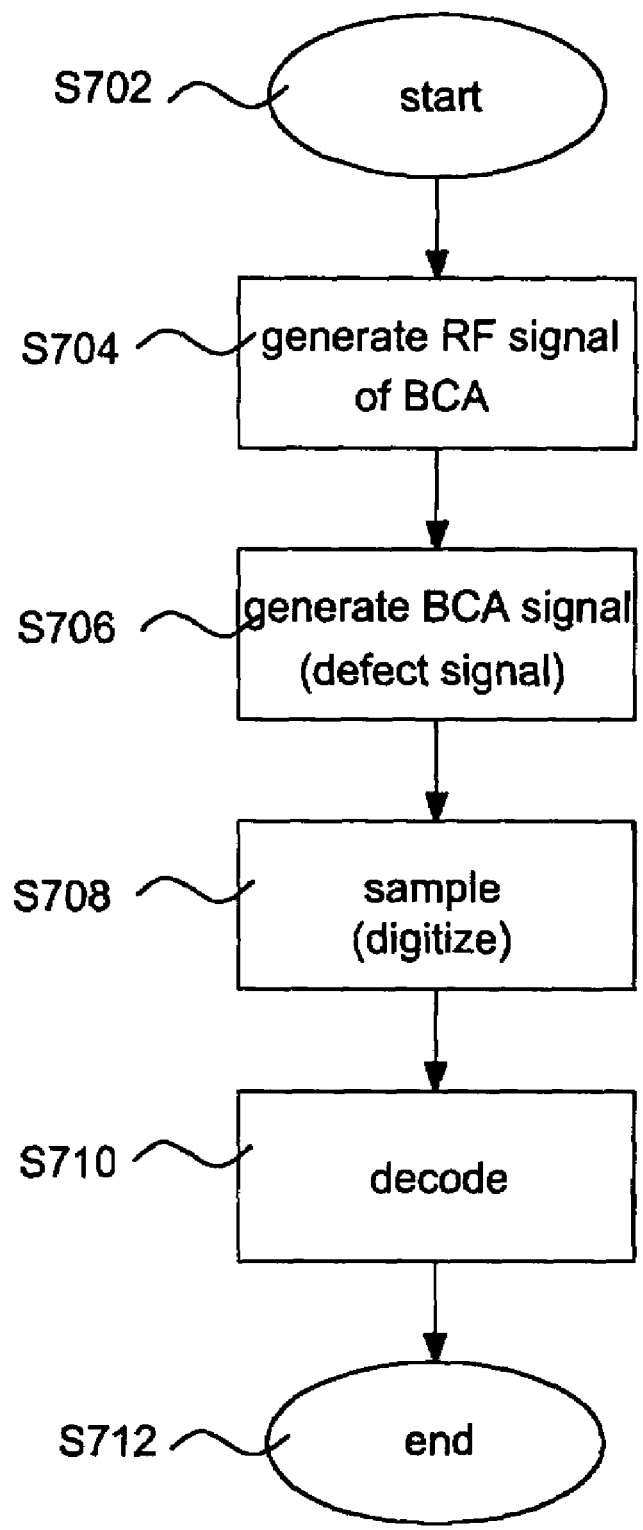
FIG. 7 is a flow chart showing the BCA data reproduction method for optical discs of the present invention.

FIG. 7 shows a flow chart of the BCA data reproduction method for optical discs of the present invention. The BCA data reproduction method includes the following steps.

Step S704: The signal amplifier generates the RF signal of BCA.

Step S706: The defect detector generates the defect signal as the BCA signal.

The defect decision unit compares the ripple amplitude signal of the RF signal of BCA to the ripple amplitude signal after being low-pass filtered. Since the optical disc drive already has the defect detector, the defect signal generated from the defect detector can be used as the BCA signal. Thus, no additional BCA detection unit has to be prepared.

Step S708: The sampling unit digitizes the BCA signal, using the sampling clock, to generate the BCA bit stream.

Step S710: The decoder decodes the BCA bit stream. The BCA channel bit demodulation, sync detection, error correction code check and error detection code check are performed according to the BCA bit stream, so as to obtain the BCA data recorded on the disc.

While certain exemplary embodiments have been described and shown in the accompanying drawings, it is to be understood that such embodiments are merely illustrative of and not restrictive on the broad invention, and that this invention not be limited to the specific construction and arrangement shown and described, since various other modifications may occur to those ordinarily skilled in the art.

What is claimed is:

1. A reproduction method for reproducing BCA (Burst Cutting Area) data for optical discs, comprising the steps of:

generating a defect signal as a BCA signal by detecting an RF (Radio Frequency) signal of the BCA;

generating a BCA data bit stream by sampling the BCA signal according to a sampling clock; and decoding the BCA data bit stream to generate BCA data.

2. The method according to claim 1, wherein the decoding step comprises the step of demodulating channel bit, detecting sync, checking error-correction-code, and checking error-detection-code the BCA data bit stream to generate the BCA data.

3. The method according to claim 1, wherein the step of generating the defect signal is to compare a ripple amplitude signal of the RF signal of BCA to the ripple amplitude signal after being low-pass filtered, so as to generate the defect signal.

4. A BCA data reproduction apparatus for optical discs, the reproduction apparatus comprising:
- a defect detector for receiving an RF (Radio Frequency) signal and generating a defect signal according to the RF signal, the defect signal serving as a BCA signal;
- a sampling unit for sampling the BCA signal according to a sampling clock to generate a BCA data bit stream; and
- a decoder for decoding to generate BCA data according to the BCA data bit stream.

5. The reproduction apparatus according to claim 4, wherein the defect detector comprises:
- a ripple amplitude detector for receiving the RF signal and generating a ripple amplitude signal of the RF signal;
- a low-pass filter for filtering out high-frequency components of the ripple amplitude signal of the RF signal to generate a filtered signal; and
- a defect decision unit for comparing the ripple amplitude signal to the filtered signal to generate the defect signal.

6. The reproduction apparatus according to claim 4, further comprising a frequency divider for receiving a reference clock and generating the sampling clock.

* * * * *